(12) United States Patent
Tsapatsis et al.

(10) Patent No.: US 7,087,288 B2
(45) Date of Patent: *Aug. 8, 2006

(54) LAYERED SILICATE MATERIAL AND APPLICATIONS OF LAYERED MATERIALS WITH POROUS LAYERS

(75) Inventors: Michael Tsapatsis, Amherst, MA (US); Hae-Kwon Jeong, Amherst, MA (US); Sankar Nair, Gaithersburg, MD (US)

(73) Assignee: University of Massachusetts, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/967,980

(22) Filed: Oct. 19, 2004

(65) Prior Publication Data

US 2005/0037209 A1    Feb. 17, 2005

Related U.S. Application Data

(62) Division of application No. 10/355,951, filed on Jan. 31, 2003, now Pat. No. 6,863,983.

(60) Provisional application No. 60/391,988, filed on Jun. 25, 2002.

(51) Int. Cl.
*B32B 3/00* (2006.01)
*B01J 29/04* (2006.01)

(52) U.S. Cl. .............. 428/134; 428/312.6; 428/314.2; 428/336; 428/446; 428/448; 428/137; 502/62; 502/63; 502/64; 502/73; 502/80

(58) Field of Classification Search ................ 428/131, 428/134, 137, 304.4, 312.6, 314.2, 336, 423.1, 428/423.7, 423.5, 425.5, 446, 448; 502/60, 502/62, 63, 64, 73, 80

See application file for complete search history.

(56) References Cited

U.S. PATENT DOCUMENTS

| | | | |
|---|---|---|---|
| 5,508,081 | A | 4/1996 | Inagaki et al. |
| 5,955,049 | A | 9/1999 | Ogata et al. |
| 6,387,269 | B1 | 5/2002 | Eltner et al. |
| 6,464,957 | B1 | 10/2002 | Kuznicki et al. |

OTHER PUBLICATIONS

Carrado, Kathleen A., "Synthetic organo- and polymer-clays: preparation . . . ," Applied Clay Science 17 (2000) 1-23.

Corma et al., "Delaminated zeolite precursors . . . ," Nature, 296:353-356, Nov. 26, 1998.

*Primary Examiner*—Jennifer McNeil
*Assistant Examiner*—Timothy M. Speer
(74) *Attorney, Agent, or Firm*—Fish & Richardson P.C.

(57) ABSTRACT

Layered silicate materials and applications are disclosed. In one aspect, the invention features layered silicate materials having pores that run generally perpendicular to the layers. In another aspect, the invention features composite materials including layered framework materials (e.g., layered silicate materials, layered Aluminophosphate materials, layered tin sulfides) having pores or openings that run generally perpendicular to the layers.

21 Claims, 16 Drawing Sheets

LAYERED SILICATE MATERIAL AND APPLICATIONS OF LAYERED MATERIALS WITH POROUS LAYERS

CROSS-REFERENCE TO RELATED APPLICATIONS

This application is a divisional application of U.S. application Ser. No. 10/355,951, filed on Jan. 31, 2003, now U.S. Pat. No. 6,863,983, which claims the benefit of U.S. Provisional Application Ser. No. 60/391,988, filed on Jun. 25, 2002. The contents of both of these applications are incorporated herein by reference in their entirety.

FIELD OF THE INVENTION

The invention relates to layered silicate and aluminophosphate materials and composites.

BACKGROUND

Inorganic microporous materials, such as zeolites, metal oxide zeotype solids, and layered silicates are of considerable technological importance due to their applications in adsorption, separation, catalysis, and ion exchange. Many of these applications utilize the inorganic microporous material in composites, such as nanocomposites.

Zeolites are built of tetrahedral $SiO_4$ and $AlO_4$, while mixed oxide zeolitic materials, e.g., titanosilicates, consist of tetrahedral $SiO_4$ and octahedral $MgO_6$. Zeolites and zeotype materials are framework materials—materials that contain one-, two-, or three-dimensional open channels whose dimension is on the order of the size of the molecules. This microporous structure provides the basis for many of the aforementioned applications.

On the other hand, layered silicates are a class of inorganic materials that are naturally layered in structure. Layered silicates refer both to natural clays, like smectites, and to synthetic layered silicates such as magadiite and mica. Among natural clays, both montmorillonite and hectorite belong to the smectite family and are the most commonly used layered silicates in nanocomposites due to their high cation-exchange capacities, surface areas, surface reactivities, and adsorptive properties (see, e.g., Carrado, K. A., "Synthetic organo- and polymer-clays: preparation, characterization, and materials applications." *Applied Clay Science*, 17, 1–23 (2000)). Synthetic layered silicates such as magadiite have also been used successfully in the synthesis of nanocomposites (see Wang, Z., Pinnavaia, T. J., "Hybrid Organic-Inorganic Nanocomposites: Exfoliation of Magadiite Nanolayers in an Elastomeric Epoxy Polymer," *Chem. Mater.* 10 1820–1826 (1998)).

The structure of typical layered silicates consists of silicate layers with aluminum octahedra, and cations between the layers to satisfy overall charge balance. For example, the crystal structure of montmorillonite consists of two fused silica tetrahedral sheets sandwiching an edge-shared octahedral sheet of either aluminum or magnesium hydroxide as shown in FIG. 1 (see, e.g., Kornmann, X., Synthesis and Characterization of Thermoset-Clay Nanocomposites, Ph.D. Thesis, Division of Polymer Engineering. Lulea, Lulea University of Technology (2000)). As in zeolites, isomorphous substitution of $[SiO_4]$ tetrahedra with $[AlO_4]^-$ tetrahedra and of $[AlO_6]^{3-}$ octahedra with $[MgO_6]^{4-}$ octahedra in the sheet causes an excess of negative charges within the layers. These net negative charges are balanced with additional cations, such as $Ca^{2+}$ and $Na^+$, located between the layers. Considerable numbers of water molecules are coordinated to these cations. These coordination bonds account for the high hydrophillicity of montmorillonite. The thickness of the layer of montmorillonite is about 1 nm, while its aspect ratio is very high, typically in the range of 100–1000 (see, e.g., Krishnamoorti, R., Vaia, R. A., Giannelis, E. P., "Structure and Dynamics of Polymer-Layered Silicate Nanocomposites," *Chem. Mater.* 8, 1728–1734 (1996)).

Conventional layered materials, e.g., montmorillonite, do not possess channel systems or open frameworks within the layers. The absence of channels and/or open frameworks limits their use in applications like catalysis, adsorption, and separation. Extensive efforts have been devoted to exfoliate layered silicates to make mesoporous materials. For example, Carrado et al. reported the synthesis of new mesoporous materials from hectorite by the removal of a polymer template used as a pore structure-directing agent (see Carrado, K. A., "Synthetic organo- and polymer-clays: preparation, characterization, and materials applications," *Applied Clay Science*, 17 1–23 (2000)). These new porous materials were successfully tested for their use as potential catalysts and catalytic supports.

An example of a layered silicate material having channels in the silicate layers is MCM-22(P). MCM-22 is a microporous aluminum silicate first reported by Mobil researchers (see Leonowicz, M. E., Lawton, J. A., Lawton, S. L., Rubin, M. K., "MCM-22: A Molecular Sieve with Two Independent Multidimensional Channel Systems," *Science*, 264, 1910–1913 (1994)). These researchers hydrothermally synthesized this material from a layered aluminum silicate precursor, which they call MCM-22(P), with hexamethyleneimine (HMI) as a structure-directing agent. Upon calcination of MCM-22(P), the thermally stable open framework MCM-22 was formed. A proposed structure of MCM-22(P), shown in FIG. 2, includes aluminum silicate layers weakly linked together with HMI along the [0 0 1] direction. The layers of MCM-22(P) consist of a hexagonal array of hourglass pockets on the [0 0 1] planes having 12-membered ring (12MR) apertures on both sides of the layers. Two-dimensional channels run in the plane of the MCM-22(P) layers. However, molecules cannot penetrate along the c-axis (perpendicular to the layers), due to the small 6-membered ring (6MR) necks, i.e., rings defined by six $[SiO_4]$ tetrahedra. Thus, there is no channel system between the layers along the c-axis, i.e., no micropores perpendicular to the layer short dimension. FIG. 3(*a*) and FIG. 3(*b*) schematically show the structure of a layer of a layered silicate with no channels and with channels in the plane of the layer, respectively.

In 1998, Corma and coworkers delaminated MCM-22(P), to make a new aluminosilicate (ITQ-2) with zeolite-type catalytic sites within thin sheets (see Corma, A., Fones, V., Pergher, S. B., Maesen, Th. L. M., Buglass, J. G., "Delaminated zeolite precursors as selective acidic catalysts," *Nature*, 396, 353–356 (1998)).

Layered silicates are promising candidates for use in composites. For example, polymer-layered silicate (PLS) nanocomposites are of great scientific and industrial interest. In the early 1990's, researchers from Toyota showed a possibility to fabricate unprecedented nanostructured materials with polymer and layered silicates (see Yano, K., Usuki, A., Okada, A., "Synthesis and properties of polyimide-clay hybrid films," *J. Polym. Sci. Part, A* 35, 2289–2294 (1997)). These researchers demonstrated nylon-based nanocomposites with layered silicates that exhibit dramatic improvements in mechanical, barrier and thermal properties with as little as 2 vol. % of layered silicates. Since then, this area has drawn considerable research efforts.

SUMMARY

The invention is based on the discovery of a porous, layered silicate material. This material is a layered silicate with three-dimensional channels in the silicate layers, including pores perpendicular to the layers. The layers are bonded by ions, e.g., cations, which occupy positions between the silicate layers. Additional ions, e.g., cations, can be located within the silicate layers. The structure of the layered silicate can be altered using ion exchange to replace the intra-layer and/or interlayer ions with alternative ions. The silicate structure can also be altered by isomorphous substitution of Si with elements known to substitute for Si in four-coordination, e.g., Al, B, Ge, Ti.

Layers can be delaminated to provide single porous silicate layers. These materials can be used in composites, such as porous nanocomposite membranes.

Accordingly, in another aspect, the invention features applications of porous, layered silicate materials, and other porous layer framework materials, such as aluminophosphates. Example applications include composite membranes and use as catalytic materials. In general, in a first aspect, the invention features a material including a first layer having a plurality of tetrahedral $SiO_4$ units, the first layer also having a plurality of channels extending from a top side of the first layer to a bottom side of the first layer.

Embodiments of the material can include one or more of the following features and/or features of other aspects.

The top side can be approximately parallel to the bottom side. The material can include a second layer comprising a plurality of $SiO_4$ units. The second layer can have a plurality of channels extending from a first side of the second layer to a second side of the second layer. The bottom side of the first layer can be approximately parallel to the top side of the second layer. The channels in the first layer can be registered with the channels in the second layer. The material can also include a plurality of cations (e.g., sodium ions and/or strontium ions) located between the bottom side of the first layer and top side of the second layer.

The first layer can be no more than about 50 Angstroms thick (e.g., 40 Angstroms, 30 Angstroms, 20 Angstroms, 10 Angstroms).

The material can include a first plurality of channels extending essentially parallel to the top side of the first layer. In some embodiments, the material can also include a second plurality of channels extending essentially parallel to the top side of the first layer and essentially perpendicular to the first plurality of channels.

The channels can be formed by eight-membered rings.

In some embodiments, the material can include another element (e.g., Al, B, Ge, Ce, or Ti) substituted for a portion of the Si atoms in the material. The element can provides acid catalytic sites or base catalytic sites within the layer.

In a further aspect, the invention features a composite material, including a continuous phase and a dispersed phase, wherein the continuous phase comprises a polymer and the dispersed phase comprises the material of the first aspect.

Embodiments of the material can include one or more of the following features and/or features of other aspects.

The polymer can be selected from the group of nylon, polyolefin, polystyrene, ethylene-vinyl acetate copolymer, polyurethane, polyimide and poly(ethylene terephthalate).

In another aspect, the invention features a porous membrane including the composite material.

In a further aspect, the invention features a material that includes a first layer including a plurality of tetrahedral or octahedral units, the first layer having a first plurality of channels and a second plurality of channels, the first plurality of channels extending from a top side of the first layer to a bottom side of the first layer, and the second plurality of channels extending essentially parallel to the top side of the first layer.

Embodiments of the material can include one or more of the following features and/or features of other aspects.

The top side can be approximately parallel to the bottom side. The tetrahedral or octahedral units can include tetrahedral $SiO_4$ or tetrahedral or octahedral Aluminophosphate. The channels can be formed from eight-membered rings. The first layer can be no more than about 50 Angstroms thick (e.g., 40 Angstroms, 30 Angstroms, 20 Angstroms, 10 Angstroms).

In another aspect, the invention features a composite material having a continuous phase and a dispersed phase, wherein the dispersed phase includes a material having a layer thickness no more than about 50 Angstroms, wherein the material includes a plurality of tetrahedral or octahedral units forming a first plurality of channels extending from a top side of the layer to a bottom side of the layer, the top side being approximately parallel to the bottom side.

Embodiments of the composite can include one or more of the following features and/or features of other aspects.

The continuous phase can include a polymer (e.g., nylon, polyolefin, polystyrene, ethylene-vinyl acetate copolymer, polyurethane, polyimide or poly(ethylene terephthalate). The dispersed phase can include no more than about 15 volume percent of the composite material (e.g. 10 vol. %, eight vol. %, five vol. %, three vol. %, two vol. %, one vol. %).

The invention also features a porous membrane including a the composite material. The membrane selectivity between a first molecule type and a second molecule type can be more than about 10 (e.g., 50, 100, 200, 500, 1000).

Embodiments of the invention can include one or more of the following advantages.

Embodiments can include layered silicate materials with improved porosity. These layered silicates can form new catalysts and adsorbents. Furthermore, nanocomposite membranes formed using layered silicates can exhibit improved porosity. Moreover, porous nanocomposite membranes can be made thinner, and can have improved selectivity and/or mechanical properties.

The terms "channels" and "pores" are used interchangeably herein. Channels are eight or more membered rings (e.g., 8MR or 12MR), and typically have a minimum diameter of more than about 3 Å (e.g., 4 Å, 5 Å, or more). Channels may have a maximum diameter of less than about 20 Å (e.g., 15 Å, 12 Å, or less).

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description.

DESCRIPTION OF DRAWINGS

Like reference symbols in the various drawings indicate like elements.

DETAILED DESCRIPTION

Structure and Synthesis

Figure 1:
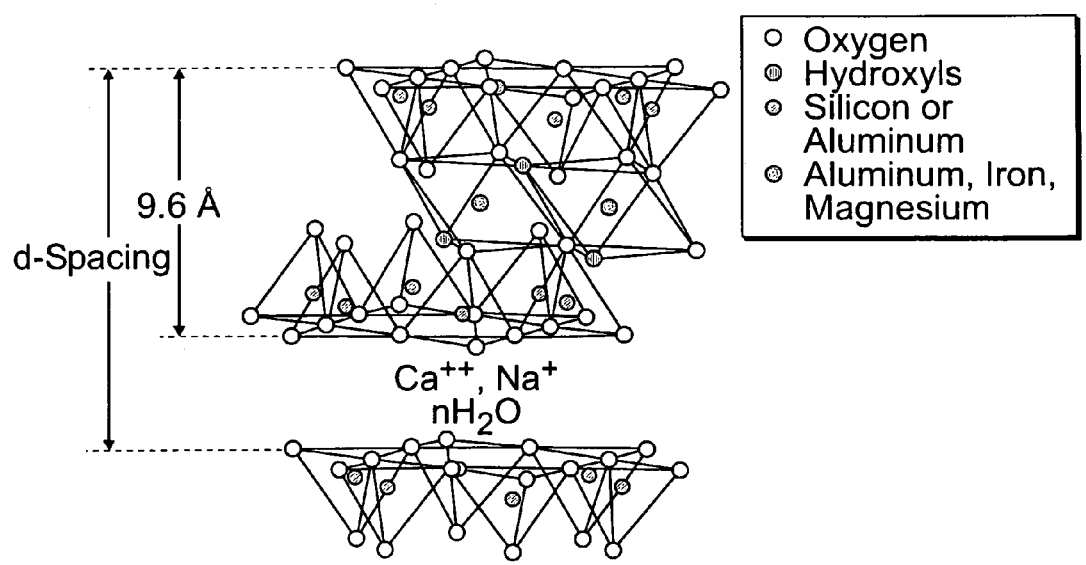
FIG. 1 is a schematic representation of the idealized structure of montmorillonite, as shown in the X. Kommann's Ph. D thesis, entitled "Synthesis and Characterization of Thermoset-Clay Nanocomposites," Division of Polymer Engineering, Lulea University of Technology, Lulea (2000).
Figure 2:
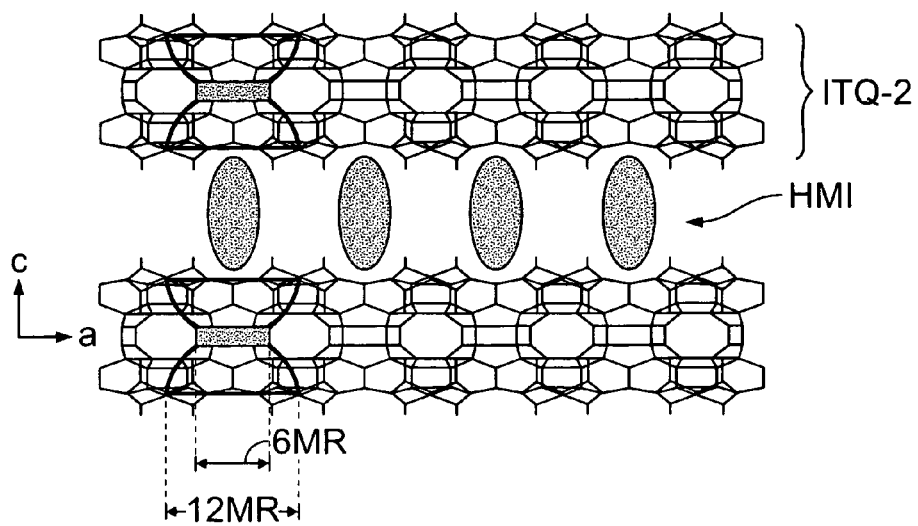
FIG. 2 is a diagram of the proposed structure of the two-dimensional microporous layered aluminosilicate, MCM-22(P).
Figure 3A:
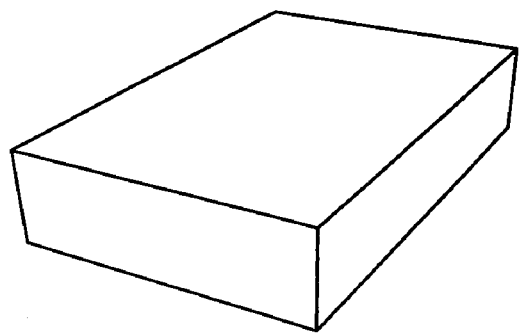
FIGS. 3(a)–3(c) are schematics of layered silicates illustrating the channel system of the silicate layer of the new materials, which are referred to herein as AMH 3 (FIG. 3(c)) as compared with those of conventional layered silicates (FIG. 3(b)) and MCM-22(P) (FIG. 3(c)).
Figure 3B:
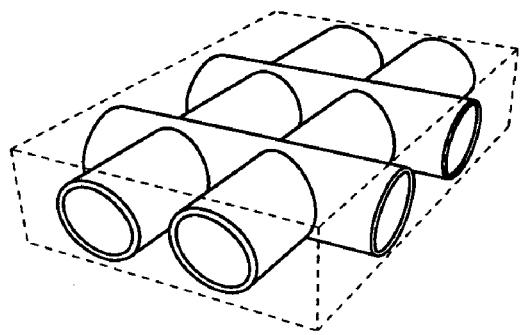
Figure 3C:
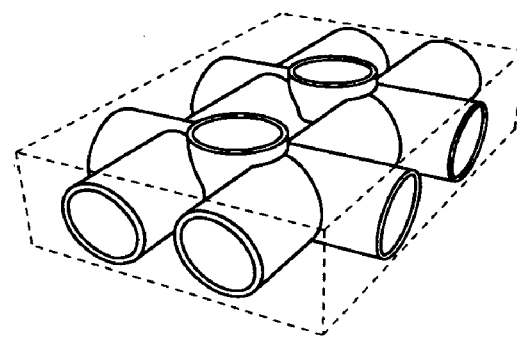

The inventors have discovered layered silicates having pores perpendicular to the plane of the layer, as well as having pores in the plane of the layer, and methods of making these new materials. This topology is illustrated schematically in FIG. 3(c), and this material is referred to herein as AMH 3.

Figure 4:
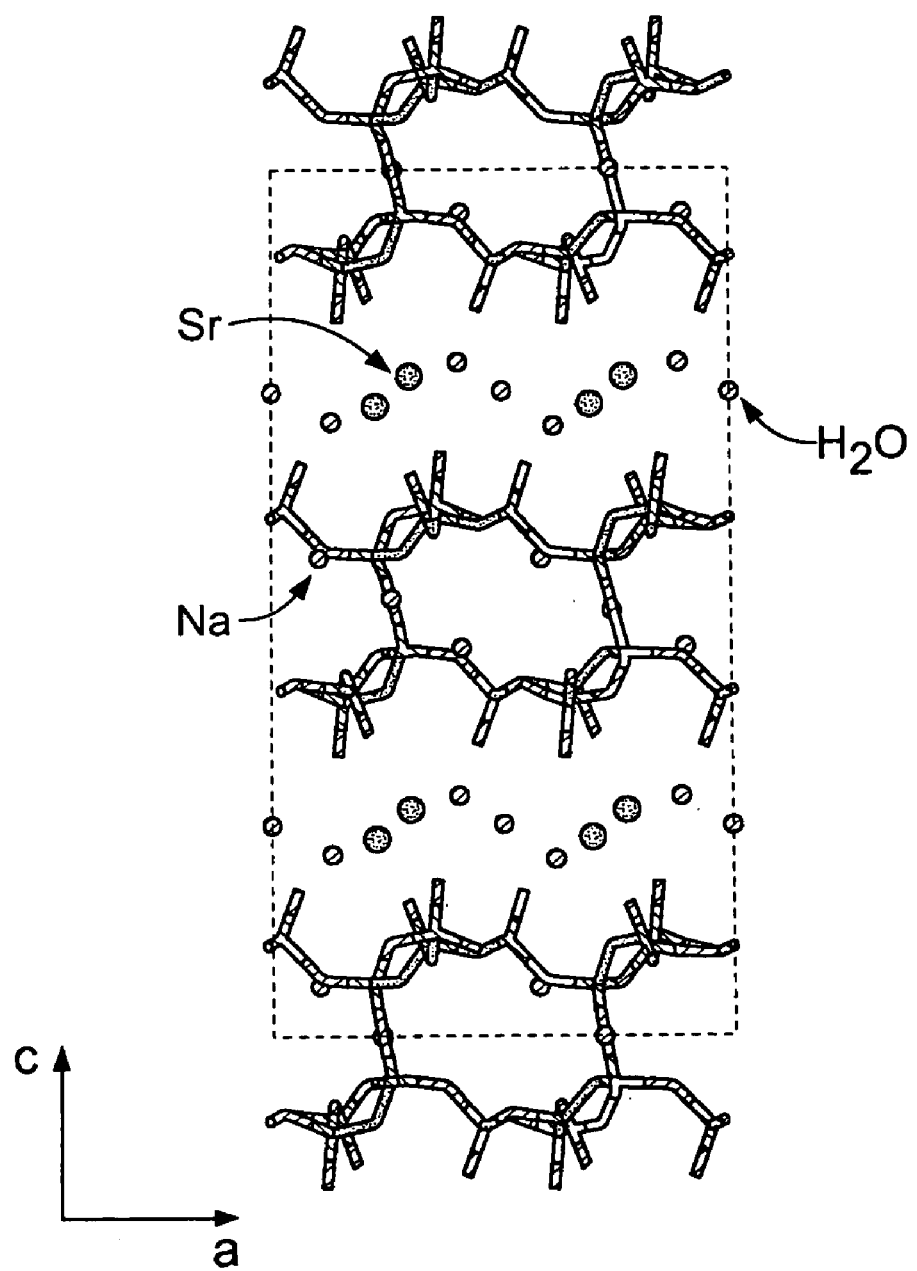
FIG. 4 is the structure of the 3-D microporous layered silicate AMH 3.

FIG. 4 shows the structure of AMH 3, viewed here in the a-c plane, which includes $SiO_4$ tetrahedra layers. There is translational ordering between adjacent layers of AMH 3, i.e., pores perpendicular to the plane of the layers are registered with similar pores in adjacent layers. Cations, such as sodium and/or strontium ions, are located between adjacent layers as well as within the pores of the layers. The interlayer cations bond the layers together. The layers have a thickness of about 1 nm, and can have aspect ratios in the 100's to 1,000's. For example, the layers can have a maximum dimension of several microns in either or both directions in the plane of the layer.

Figure 5A:
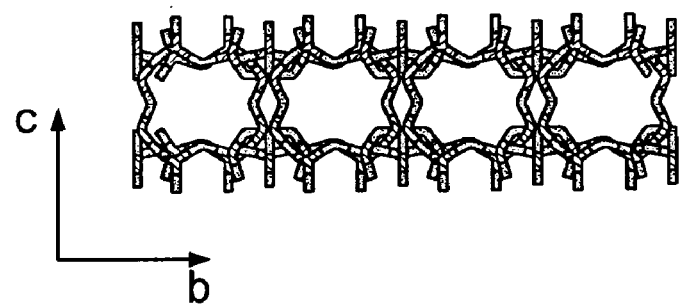
FIGS. 5(a)–5(c) are views of the structure of a layer of AMH 3.
Figure 5B:
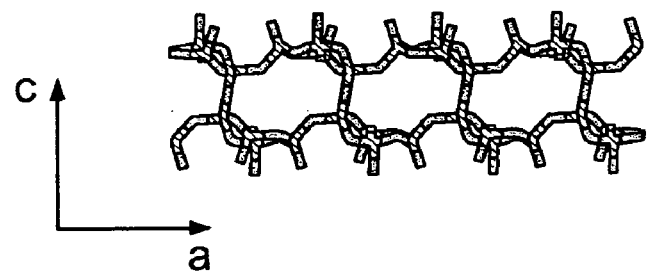
Figure 5C:
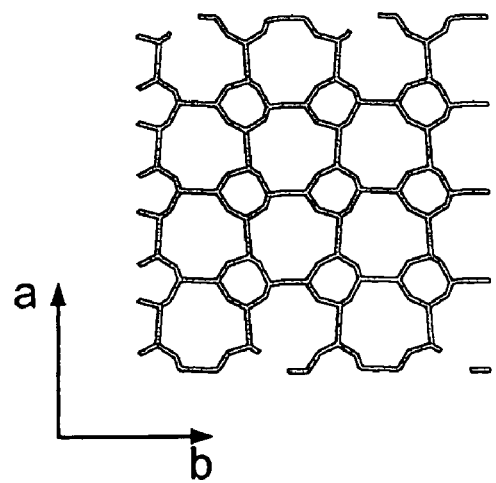

The structure of a single silicate layer of AMH 3 viewed respectively in the c-b, c-a, and a-b planes, is shown in FIGS. 5(a)–5(c). Each layer of AMH 3 possesses three-dimensional micropores, running perpendicular to the layers as well as in the plane of the layers. This three-dimensional pore structure differentiates AMH 3 from other layered silicates. Straight channel systems composed of eight-membered rings (8MR) run along the a- and b-axis. Another 8MR runs along a direction slightly tilted from the c-axis. The silicate is porous because of these channels. This porosity is important for applications involving catalysis as it allows molecules access to catalytic sites.

Catalytic sites can be introduced by isomorphous substitution for silicon in the microporous layers with elements known to substitute for silicon in framework microporous materials like zeolites. Such elements include, for example, boron, aluminum, and titanium. Titanium, for example, can provide oxidative catalytic sites. Acid catalytic sites can be introduced into the layered silicate by ion exchange of intralayer cations with ammonium cations, followed by calcination at elevated temperatures, e.g., temperatures ranging from 100° C. to 600° C. Catalytic activity can also be introduced by ion exchange with cations known to lead to base framework catalysts, e.g., cesium ions. The pores in the silicate layer of AMH 3 are so-called "small pores," formed by eight $SiO_4$ tetrahedra, and have diameters of approximately 3–4 Å. These pores are in the size range of small molecules such as nitrogen, methane, ethane, carbon dioxide, and oxygen. While the size of the pores is largely dictated by the size of the rings, pore size can be manipulated through ion exchange, as is common practice in microporous framework materials like zeolites and titanosilicates. For example, the pore size in the space between the microporous silicate layers can be manipulated by methods used in other layered silicates, such as hectorite (see, for example, Carrado, K. A., "Synthetic organo- and polymer-clays: preparation, characterization, and materials applications," *Applied Clay Science*, 17, 1–23 (2000))

Due to its dual character, i.e., microporous silicate framework/layered silicate, AMH 3 can be subjected to similar modification methods as those used in other layered silicates and in silicate frameworks, such as zeolites. These methods include exfoliation, and ion exchange of the gallery ions, but also isomorphous framework substitution and ion exchange of cations located in the micropores.

Due to its novel pore structure, AMH 3 can be used in applications previously considered inappropriate for layered silicates. Additionally, AMH 3 is stable at high temperatures, e.g., at temperatures in excess of 500° C. In other words, the layers do not dissociate at these temperatures, making AMH 3 a candidate for high temperature applications as well. Accordingly, several applications, including polymer-layered silicate (PLS) nanocomposite membranes and thin films are described below. These applications are enabled by the 3-D microporosity of the silicate layer, especially the porosity perpendicular to the layer thickness.

AMH 3 can be synthesized hydrothermally in the presence of a base. In this process, a base catalyzes the hydrolyzation of a silica source in aqueous solution. The layered silicate is crystallized from this solution. After washing and drying, the crystals can be separated from amorphous material by repeated precipitation.

Reagents for AMH 3 synthesis include sodium hydroxide, strontium chloride, and a silica source, e.g., tetraethylorthosilicate, colloidal silica or sodium silicate. The pH of the solution is adjusted to be in the range in the range 11 to 14. The temperature can be between 30° C. and 300° C., e.g., in the range 90° C. to 200° C. While titanium is not present in the layered silicate in appreciable amounts, the synthesis is performed in the presence of a titanium source, such as titanium trichloride. The desirable range of Ti/Si in the synthesis mixture can range between 0 and 1, such as about 0.1. Further details regarding AMH synthesis are provided in examples below.

Polymer-Layered Silicate Nanocomposites

AMH 3 can be dispersed in a polymer to form a polymer-layered silicate (PLS) nanocomposite. In general, the ratio of layered-silicate to polymer in a PLS depends on the specific application and the compatibility of the layered-silicate and polymer. In some cases, a relatively small amount of layered silicate (e.g., 2 vol. %, 1 vol. % or less) is all that is needed to provide the PLS with desired properties. Alternatively, in some cases, the amount of layered silicate in the composite can be more than 10 vol. %, such as 50 vol. % or more.

Various polymers, including both thermosets and thermoplastics, can be used as a continuous phase in PLS nanocomposites. These polymers include nylons, polyolefins, polystyrene, ethylene-vinyl acetate (EVA) copolymer, epoxy resins, polyurethanes, polyimides, and poly(ethylene terephthalate) (PET). Specific applications may require particular property improvements of the nanocomposite, which can be realized by the correct selection of polymeric materials as well as layered silicates.

Figure 6A:
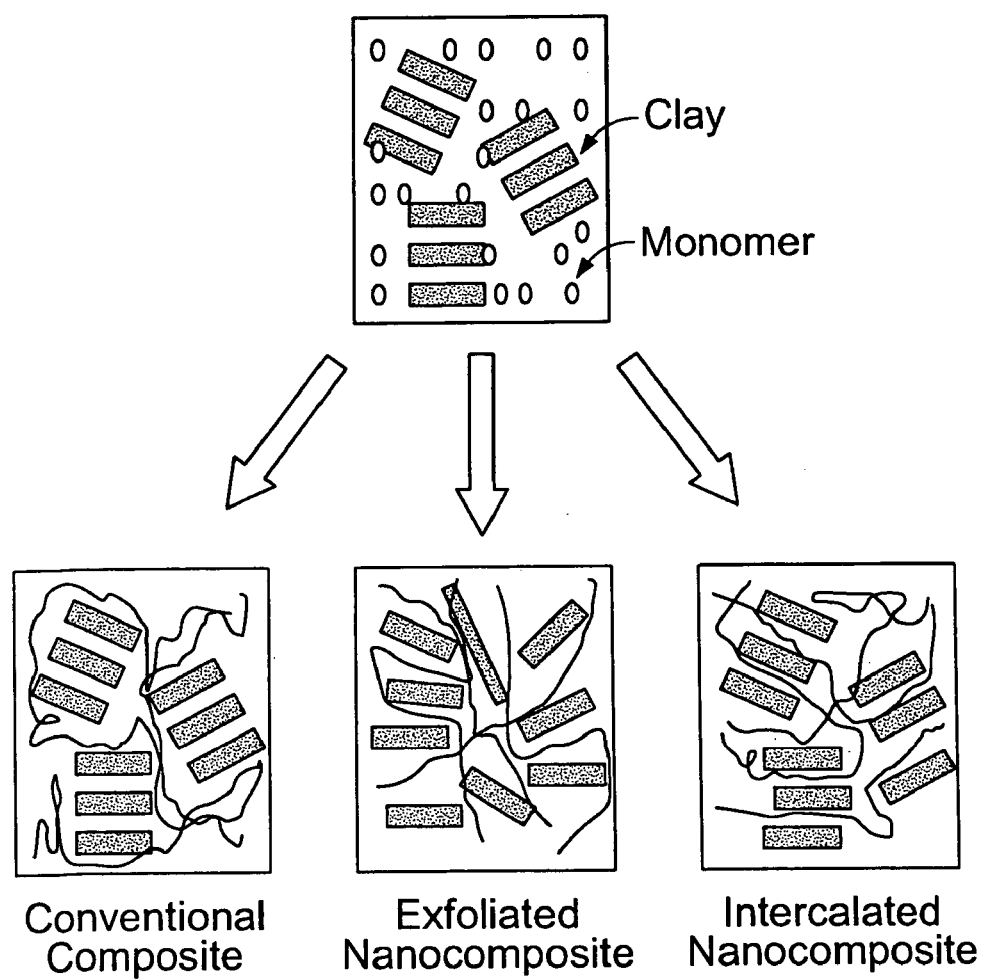
FIG. 6(a) is schematic diagram comparing different polymer-layered silicate (PLS) nanocomposites.

FIG. 6(a) shows three different PLS nanocomposite morphologies resulting from three different manufacturing approaches (see, e.g., Kommann, X., "Synthesis and Characterization of Thermoset-Clay Nanocomposites," Ph.D. Thesis, Division of Polymer Engineering, Lulea, Lulea, University of Technology, 2000). One approach is to use a layered silicate as conventional filler, i.e., taking a layered silicate and dispersing it in polymer matrix without any modification in the structure of the layered silicate. In the other two approaches, intercalation and delamination, a chemical reaction modifies the structure of the layered silicate. In the case of intercalated PLS, organic species are inserted between the layers, so that the inter-spacing of the layers is expanded, but the registry of the layers in the layered silicates retains some of its order. In the delaminated PLS, individual layers of the layered silicates are dispersed in a polymer matrix. The latter two approaches to fabricate PLS nanocomposites usually have more of an impact on the properties of the nanocomposite, such as mechanical properties and gas and vapor permeability properties.

Due to inherent hydrophilicity of many layered silicates, and hydrophobicity of many polymers, it is often important to modify both the polymer and the layered silicate to obtain a successful PLS nanocomposite. Strong hydrophilicity in the layered silicate is due to the cations between the layers. Accordingly, successful fabrication of PLS nanocomposites often involves modifying the layered silicates so the layers are compatible with an organic species, i.e., replacing the metal cations in the layered structure with organic cations. The layers can be modified by ion-exchange of the metal cations with surfactants like alkylammonium ions. For example, $Na^+$ in montmorillonite is exchanged with alkylammonium ions as follows:

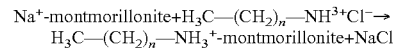

$$Na^+\text{-montmorillonite} + H_3C-(CH_2)_n-NH^{3+}Cl^- \rightarrow$$
$$H_3C-(CH_2)_n-NH_3^+\text{-montmorillonite} + NaCl$$

Figure 6B:
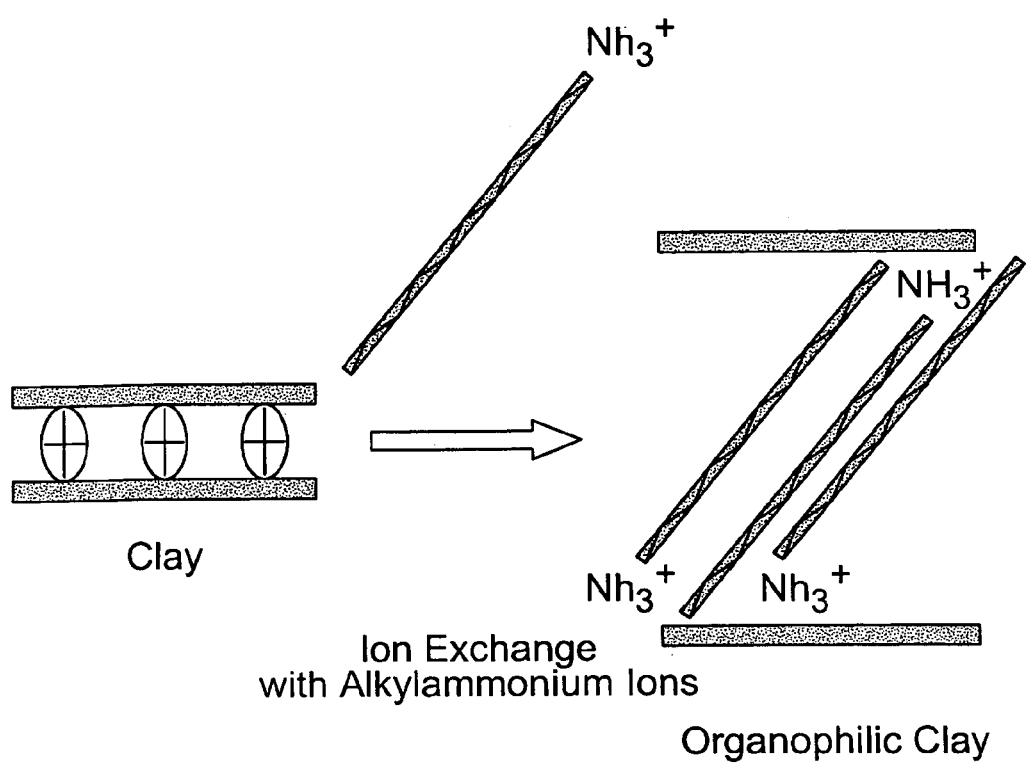
FIG. 6(b) is a schematic illustrating cation-exchange with alkylammonium ions.

This process is illustrated in FIG. 6(b). Depending on the charge density of the layer, the incorporation of the alkylammonium ions leads to different microstructures between the layers, such as monolayers, bilayers, pseudotrimolecular layers, and paraffin type monolayers. The interlayer-spacing depends on the length of the linear hydrocarbon tails in alkylammonium ions—the longer the tail, the wider the gap will be.

Figure 6C:
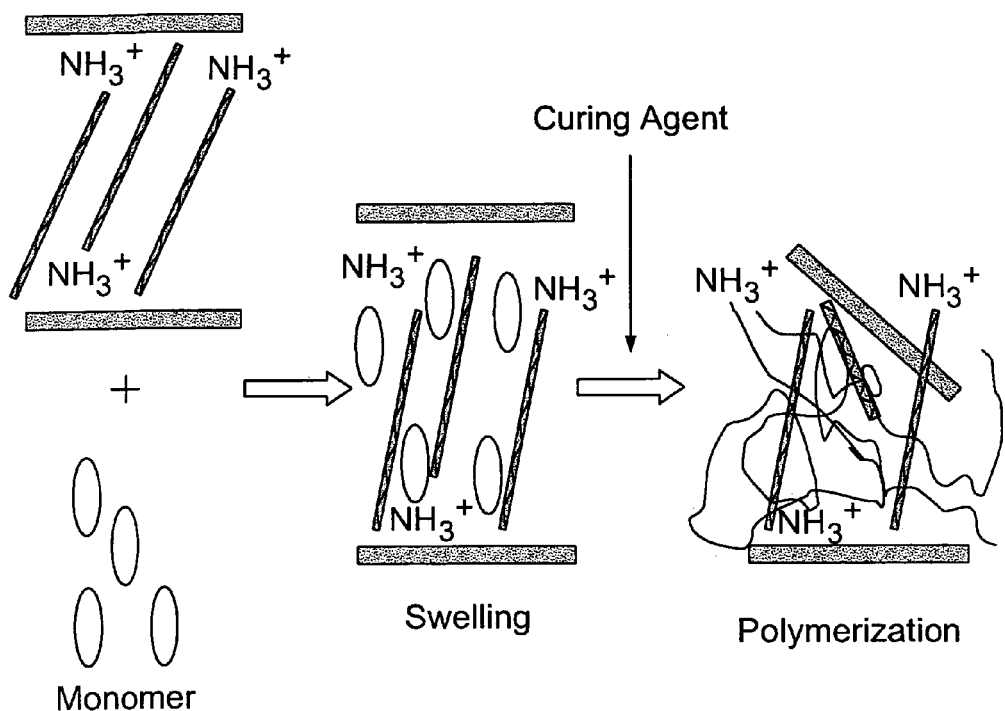
FIG. 6(c) is a schematic illustrating an in-situ polymerization approach.
Figure 6D:
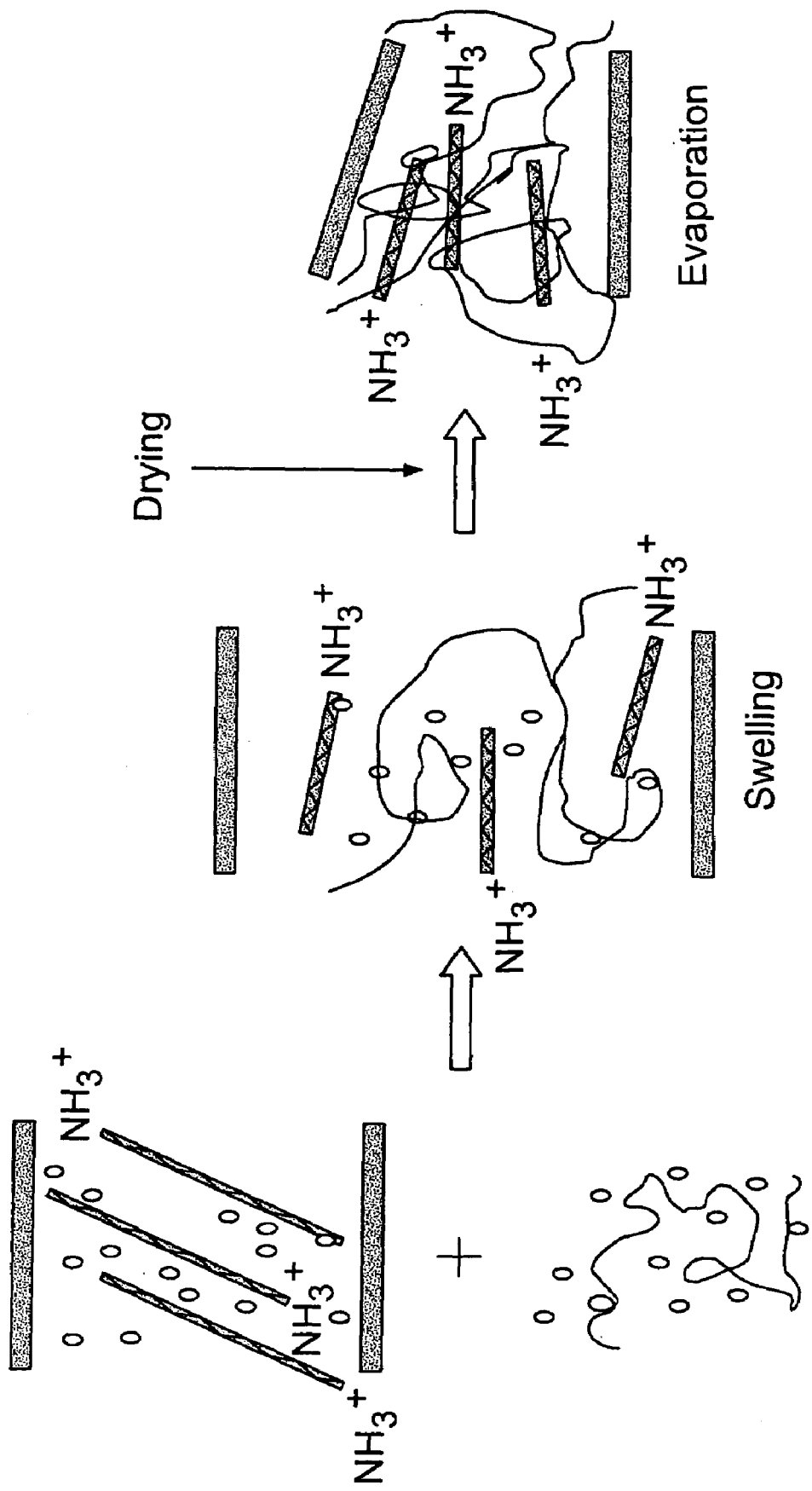
FIG. 6(d) is a schematic illustrating a solution blending approach.

Referring to FIGS. 6(c) and 6(d), polymers can be incorporated in PLS nanocomposites by in situ monomer polymerization melt or by solution blending. For example, the first nylon-clay nanocomposite was synthesized by an in situ polymerization method. A similar approach can be used to synthesize an AMH 3 PLS nanocomposite.

In the in situ polymerization approach shown in FIG. 6(c), an organophilic layered silicate is prepared. Mixing this organophilic layered silicate with a monomer swells the layered silicate. Next, a curing agent, such as tetrakis dimethoxysilane, is added to initiate the polymerization reaction, leading to polymerization. Careful control of the polymerization reaction ensures that intra-polymerization dominates over extra-polymerization. In other words, polymerization should be controlled to occur predominantly between the silicate layers to achieve delamination.

On the other hand, solution blending, shown in FIG. 6(d), uses a polar solvent (e.g., toluene) to solvate both the organophilic layered silicate and the polymer. The organophilic layered silicate swells considerably. The two species are mixed together in the solution and polymer is intercalated between the layers. Upon evaporation of the solvent, a PLS nanocomposite is obtained. Suitable polymers for this approach include high-density polyethylene and polyimides.

Figure 6E:
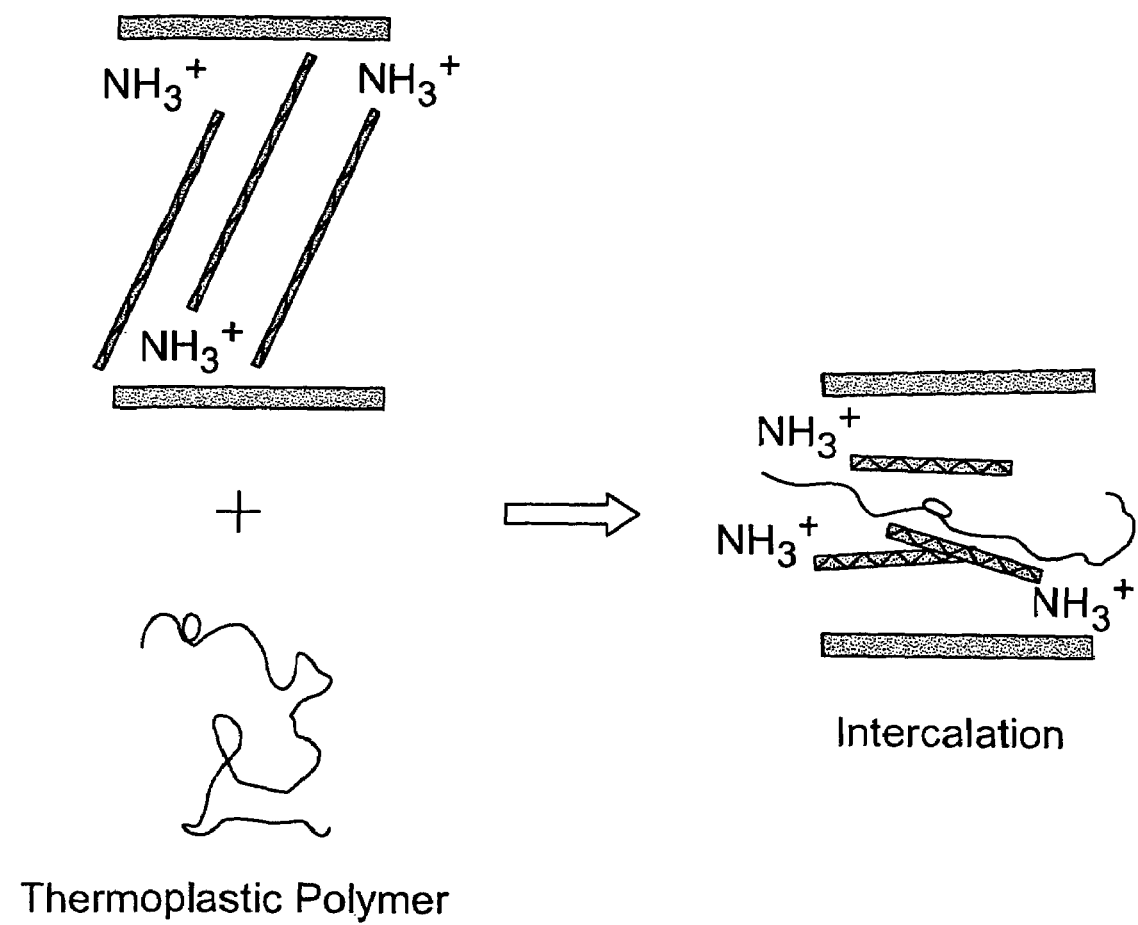
FIG. 6(e) is a schematic illustrating a melt blending approach.

Referring to FIG. 6(e), melt blending is another approach for forming AMH 3 PLS nanocomposites. This method was first adapted for PLS nanocomposites by Vaia et al (Vaia Vaia, R. A., Ishii, H., Giannelis, E. P., "Synthesis and properties of two-dimensional nanostructures by direct intercalation of polymer melts in layered silicates," Chem. Mater., 5, 1694–1696 (1993)). In this method, a molten thermoplastic polymer is blended with an organophilic layered silicate. The mixture is then annealed at a temperature above the polymer's glass transition temperature, forming a nanocomposite.

Another class of PLS materials are PLS films. AMH 3 PLS films can be formed using various techniques, e.g., the Layer-by-Layer (LBL) and Langmuir-Blodgett (LB) assembly techniques.

The LBL method involves the adsorption of charged polyions or particles on an oppositely charged surface. A solid substrate, e.g., with positive charges, for example, is immersed in a solution of oppositely, e.g., negatively, charged polyions that are adsorbed onto the surface due to electrostatic interactions. The surface charge is reversed, e.g., is now negative, and after being rinsed with water and drying, the substrate can be immersed in a solution of positively charged polyions, clays, proteins or nanoparticles. Repeated adsorption, rising, and drying of charged molecules gives rise to the assembly of hybrid films composed of the desired number of layers.

The simplicity of the layer-by-layer (LBL) assembly technique makes it an appealing candidate for the production of thin film nanostructured materials. Such films show promise for various technological applications such as sensors, electrically conductive films, magnetic films, gas separation membranes, resists, and optics.

Figure 7A:
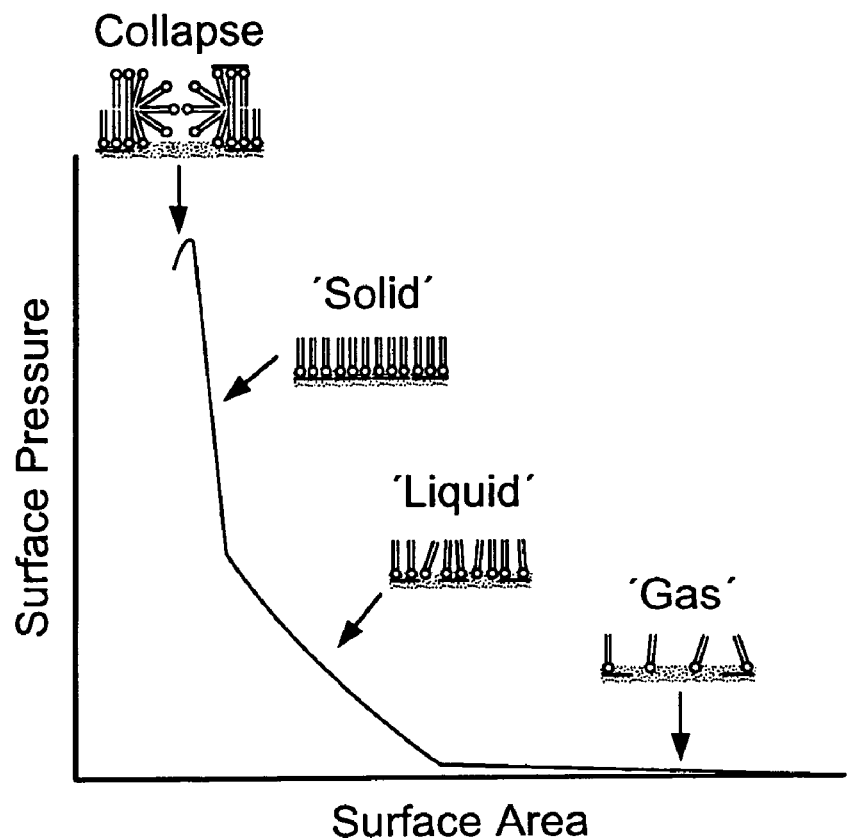
FIGS. 7(a) to (c) are schematics of the Langmuir-Blodgett (LB) technique, showing: (a) compression isotherm; (b) deposition in the upward direction; and (c) a monolayer of a clay/cation hybrid film.
Figure 7B:
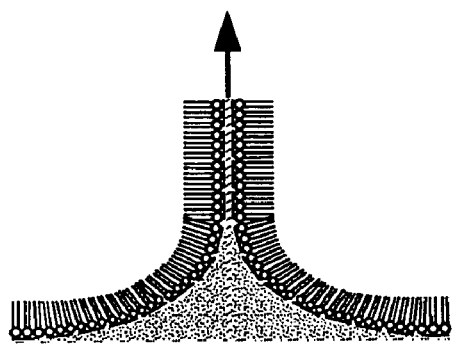
Figure 7C:
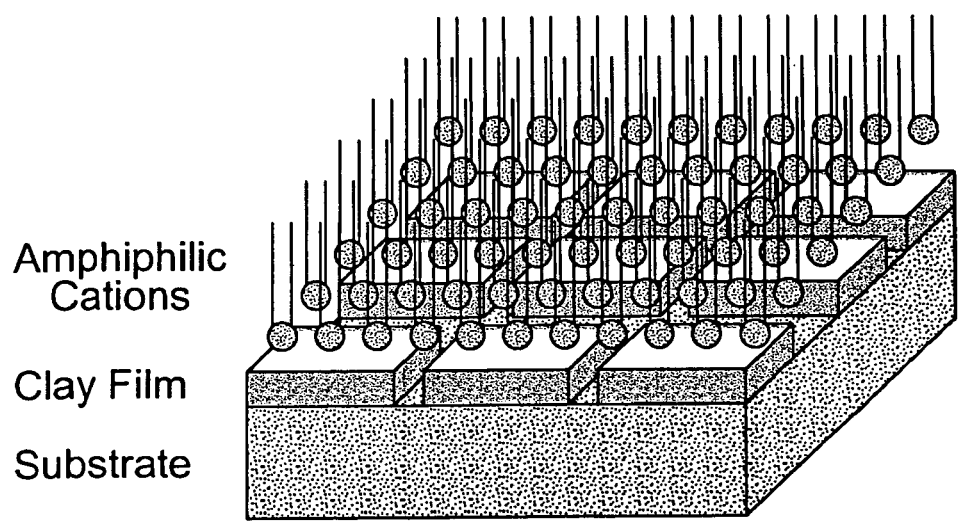

Another assembly technique, the LB technique, is schematically illustrated in FIGS. 7(a)–7(c). In this technique, a solution of an amphiphilic cation is spread on a subphase of an AMH 3 dispersion in an LB trough. The film is compressed and a surface pressure-molecular area (p-A) isotherm is collected. A monolayer is then transferred at a surface pressure that will either give a liquid, more fluid-like, or solid, compact well-ordered, layer. The cation/clay monolayer is transferred by the vertical dipping method onto a hydrophilic substrate (glass, silicon wafer, etc.). Multiple layers can easily be transferred by the LB technique.

AMH 3 Nanocomposite Membranes

Figure 8:
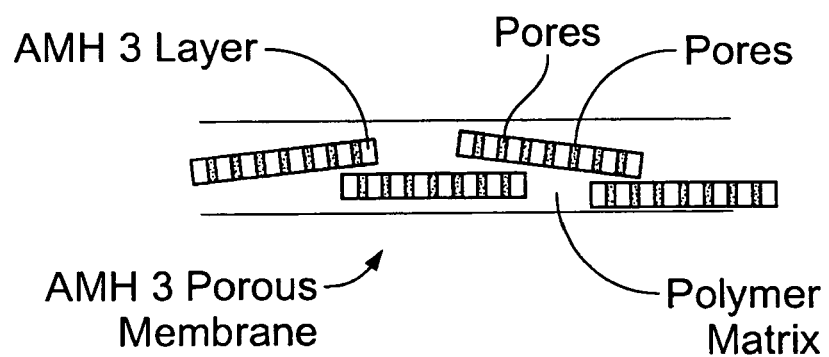
FIG. 8 is a schematic of an AMH 3 porous membrane.

AMH 3 can also be used to prepare PLS nanocomposite membranes. Since AMH 3 has pores in all three directions, these membranes can behave as selective membranes, combining the favorable aspects of polymer membranes with the increased selectivity of molecular sieves. An example of an AMH 3 membrane is shown in FIG. 8. Individual AMH 3 layers are oriented in the plane of the membrane. This morphology provides very thin membranes (e.g., on the order of one or two AMH 3 layers) with pores oriented approximately perpendicular to the plane of the membrane.

AMH 3 membranes are prepared by first delaminating the silicate layers. For example, AMH 3 can be delaminated by removing the cations located between the layers. There are several possible ways of removing the cations. For example, the inorganic cations can be replaced with organic cations, e.g., using an amine. These organic cations can then be removed by, e.g., calcination or using an organic solvent, like toluene. Alternatively, a sufficiently basic or acidic environment can be used to delaminate the layers during an ion exchange step. Examples of such processes as used with other materials are described in, e.g., Corma et al. in "Delaminated zeolite precursors as selective acidic catalysts," Nature, 396, 353–356 (1998).

The delaminated layers are then dispersed in a polymer, such as one of the polymers described herein. The delaminated layers can be ordered, e.g., by aligning the layer normals to the membrane normals, within the polymer matrix by, e.g., orienting the matrix (e.g., mechanically or electrically).

In some embodiments, AMH 3 membranes are permeable to certain molecules. For example, AMH 3 membranes can be permeable to molecules such as nitrogen, carbon dioxide, methane, and/or oxygen. For example, oxygen permeability can be 1,000 Barrers or more. In other implementations, the oxygen permeability can be 0.1 Barrers or less. In general, the permeability of AMH 3 membranes for a molecule depends on the exact structure of the membrane, and can be tailored to provide a desired permeability for a particular molecule. One way to tailor the membrane structure is to appropriately modify the AMH 3 silicate layers by ion exchange, for example, with ions like potassium, barium, lithium, yttrium, lanthanum as is common practice in fine-tuning adsorption properties in small pore zeolites.

An AMH 3 membrane can be more or less permeable (i.e., selectively permeable) to a first molecule compared to a second, different molecule. Accordingly, AMH 3 membranes can be used for separating materials, e.g., gases. For example, AMH 3 membranes can be preferably or selectively permeable to oxygen, but substantially less permeable to nitrogen. $O_2/N_2$ selectivity can be 100 or more, or less than one. Selectivity refers to the ratio of permeabilities. In another example, AMH 3 membranes can be more permeable to carbon dioxide compared to methane, and can be used to separate a mixture of these gases. In yet another example, AMH 3 membranes can separate mixtures of nitrogen and methane, being more permeable to nitrogen.

Figure 9:
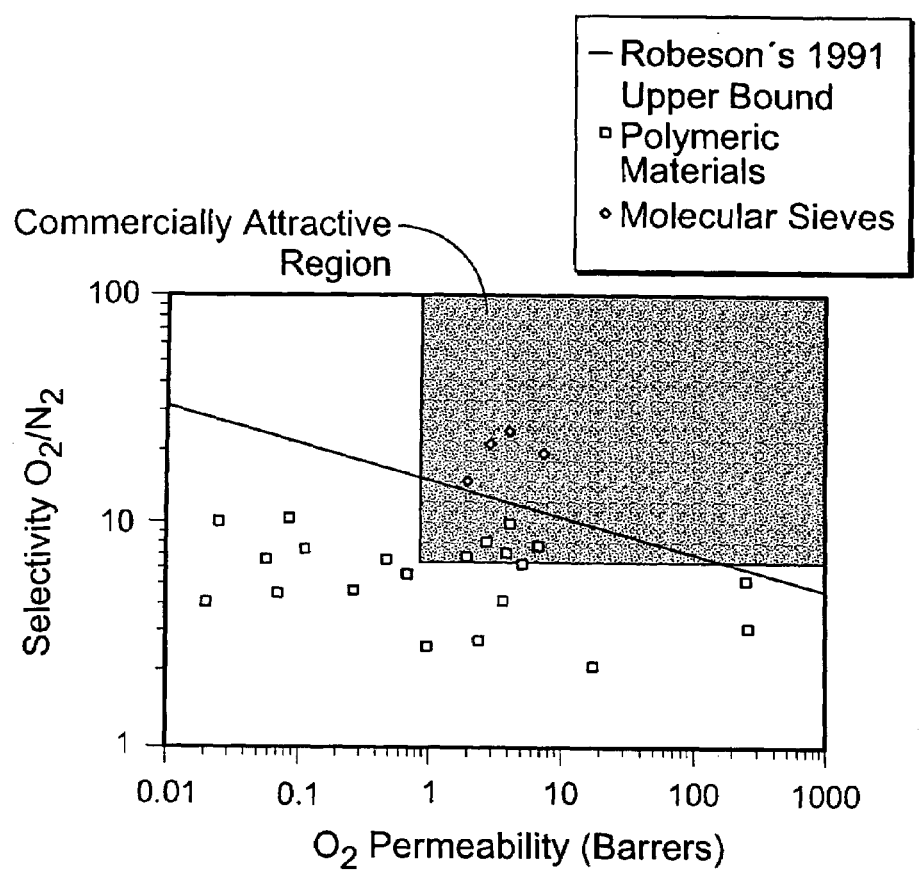
FIG. 9 is a plot of oxygen permeability vs. oxygen/nitrogen selectivity for various polymer and molecular sieve materials, in which the line indicates Robeson's upper bound for polymeric materials.

The performance (i.e., $O_2$ permeability and $O_2/N_2$ selectivity) of current polymer and molecular sieving membranes and their commercial attractiveness is compared in FIG. 9. Most polymers perform below Robeson's (1991) upper bound, which is the "glass ceiling" on polymers to have both high selectivity and high permeability. In some implementations, AMH 3 PLS membranes can perform in a commercially attractive region, demarcated by the grey region in FIG. 9. This can be achieved by appropriately modifying AMH 3 silicate layers by ion exchange, for example with ions like potassium, barium, lithium, yttrium, lanthanum as is common practice in fine-tuning adsorption properties in small pore zeolites. These modified layers can be incorporated in PLS composites with the methods described above.

These membranes can be used in various gas separation applications such as oxygen generation/enrichment from air streams, natural gas purification, and carbon dioxide removal.

Although the foregoing description refers to AMH 3, similar composite materials can be formed from other microporous layered materials having channels perpendicular to the layer plane. Examples of other microporous layered materials include aluminophosphate sheets with pore opening, such as 8MR pore opening and 12MR pore openings. Aluminophosphates having 8MR pore openings are disclosed by Y. W. Yao, et al., in "Synthesis and characterization of a new layered aluminophosphate intercalated with triply-protonated triethylenetetramine $C_6H_{21}N_4Al_3P_4O_{16}$," J. Solid State Chem., 146, 458–463 (1999) and aluminophosphates having 12MR pore openings are disclosed by B. Wei et al., in "A new layered aluminophosphate $Al_2P_4O_{16}C_6H_{22}N_4C_2H_{10}N_2$ with 4.12-net porous sheets," J. Chem. Soc. Dalton Trans., 1979–1980 (2000), for example.

EXAMPLES

The invention is further described in the following examples, which do not limit the scope of the invention described in the claims.

1. Synthesis and Characterization of AMH 3

The synthesis solution had a molar composition of 1 $TiO_2$:10 $SiO_2$:14 NaOH:x $SrCl_2$:675 $H_2O$, 2<x<14. In a typical experiment, sodium hydroxide was dissolved in deionized water, and strontium chloride hexahydrate was added. The mixture was stirred for 1 hour in a silicone oil bath at 353 K. Sodium silicate solution (27% $SiO_2$, 14% NaOH, 59% $H_2O$, Aldrich) was then added to the above solution and stirred for 30 minutes. Finally, titanium(III) trichloride (20% $TiCl_3$, 20% HCl, 60% $H_2O$, Aldrich) was added very slowly under vigorous stirring. The mixture was then homogenized by stirring for 30 minutes. The resulting solution was then introduced into a TEFLON®-lined stainless steel autoclave (Parr) and crystallized at 473 K with varying crystallization times. The product was washed with deionized water to neutral pH, and dried at 363 K overnight. The crystals were separated from amorphous material by repeated precipitation from suspension. Temperature-resolved powder X-ray diffraction patterns were collected on a well-ground sample, using a Philips X'Pert® diffractometer equipped with a Paar high temperature attachment. The chamber was swept with a 50 cc/min helium flow to maintain an inert atmosphere. The sample was equilibrated for 1 hour at each temperature before data collection.

For initial structure determination, powder X-ray data was collected from a well-crushed sample at room temperature. A well-aligned Philips X'Pert® diffractometer operating in a Bragg-Brentano geometry was used, with 1 (Cu K$\alpha$1)= 1.5406 Å and a K$\alpha$2:K$\alpha$1 intensity ratio of 0.523. Data was collected from 5–100° 2$\theta$ with an angular step size of 0.02° 2$\theta$, and a data collection time of 125 seconds/step. Divergence and receiving slits of 1/32° were used. Powder synchrotron X-ray data for structure refinement was obtained at room temperature in a Debye-Scherrer geometry on beamline X7A of the National Synchrotron Light Source (Brookhaven National Laboratory), with 1=0.690911 Å, an angular range of 3–42° 2$\theta$, and an angular step size of 0.01° 2$\theta$. ICP-OES chemical analysis of the material was carried out by Galbraith Laboratories (Knoxville, Tenn.).

Figure 10A:
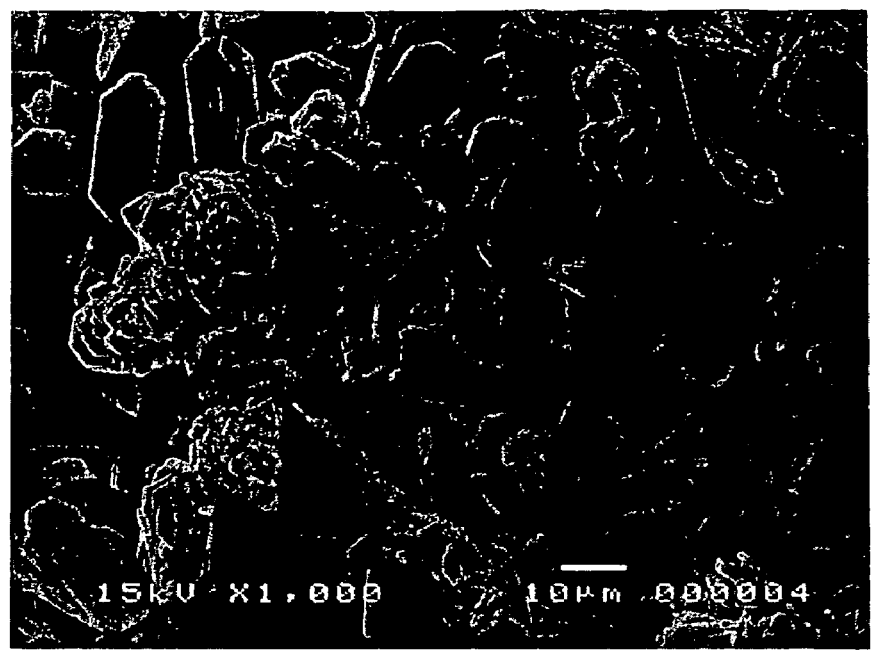
FIG. 10(a) is an SEM image of purified crystalline AMH 3.
Figure 10B:
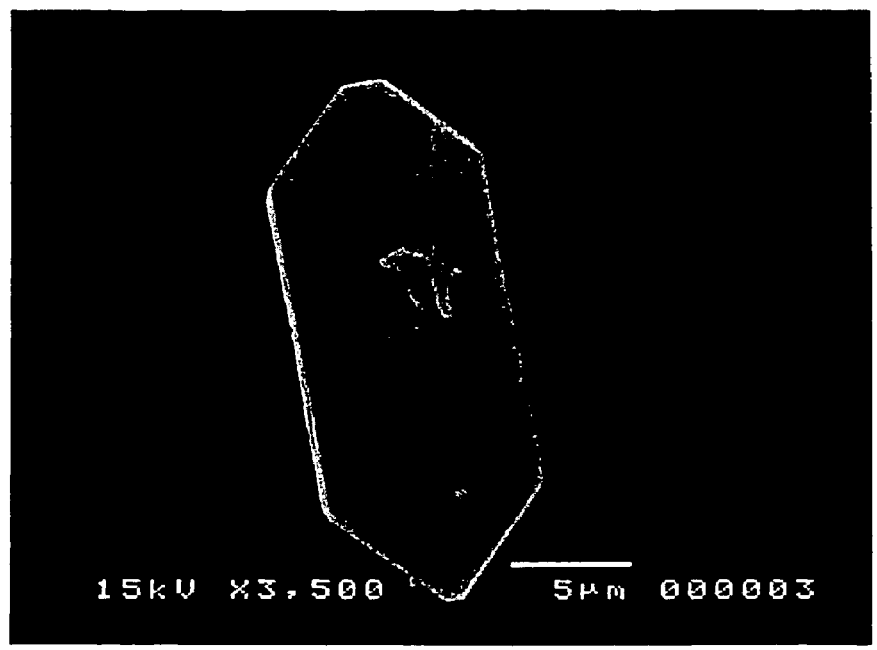
FIG. 10(b) is an SEM image of an individual prismatic crystal of AMH 3.
Figure 11:
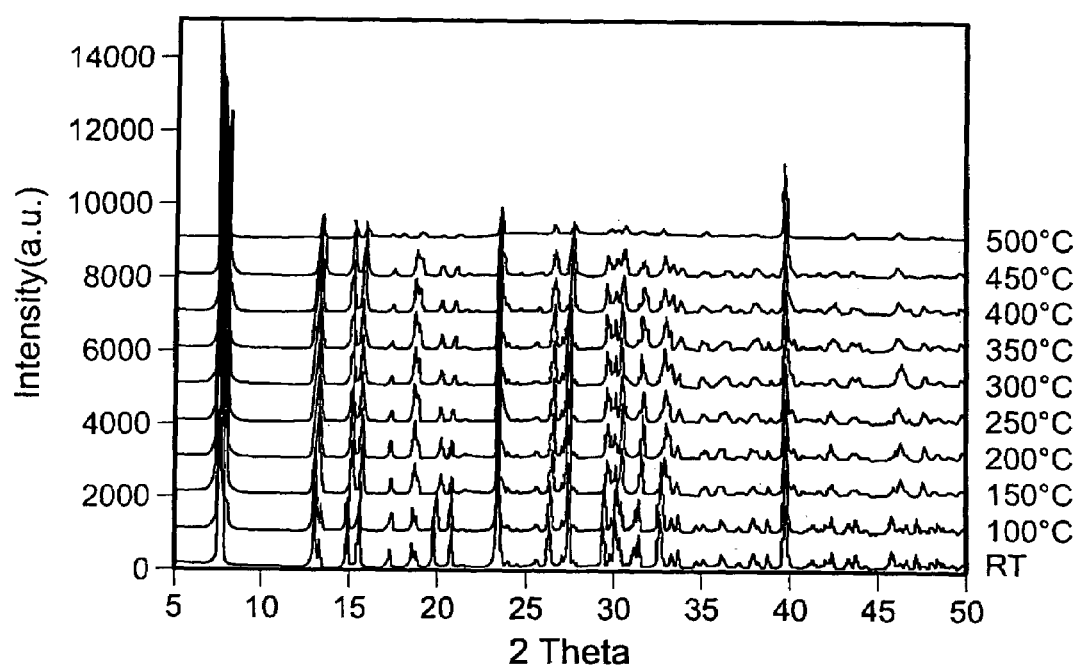
FIG. 11 is a temperature-resolved X-ray powder diffraction pattern of AMH 3.

FIG. 10(a) shows an SEM image of the purified crystalline product, indicating that the amount of amorphous matter or other impurity phases in the purified sample is small. FIG. 10(b) shows an individual prismatic crystal of the material. FIG. 11 shows temperature-resolved X-ray powder diffraction patterns collected from the material, indicating that it remains crystalline up to 723 K with little lattice contraction. The structure appears to collapse at a temperature of 773 K, though the lowest angle reflection retains considerable X-ray intensity.

All the reflections in the high resolution powder pattern (taken in Bragg-Brentano geometry) could be indexed with a monoclinic unit cell. Examination of the systematic absences and limiting conditions led to two possible space groups: Cc (No. 9) and C2/c (No. 15). The latter was chosen first due to its higher symmetry, and was verified by successful structure determination. The structure was solved by direct methods using the EXPO® software. The structure solution-located all the Si atoms, as well as the O atoms bonded to the Si atoms. The heavy extra-framework $Sr^{2+}$ cations were also located. It was clear from the software analysis that the material was a microporous layered silicate with a new topology. No titanium atoms were found in the structure. The preliminary unit cell formula of the material, based on the atoms located from the structure solution, was $Sr_8Si_{32}O_{76}$. Chemical analysis by ICP-OES yielded the following elemental molar ratios: Si:Sr=4.1, Ti:Si=0.01, and Na:Sr=0.9. The first two ratios are in excellent agreement with the preliminary chemical formula, which has a Si:Sr ratio of 4.0 and no titanium in the structure. The chemical analysis also indicates the presence of almost one $Na^+$ cation for every $Sr^{2+}$ cation. Additionally, a thermogravimetric analysis of an uncrushed sample of the purified material indicates that there were 15–17 water molecules per unit cell, if the sodium atoms are also included in the chemical formula.

The preliminary structure was used as a starting model for a Rietveld refinement, to improve the structural parameters for the known atoms and to locate the $Na^+$ cations and the water molecules. The General Structure Analysis System (GSAS) structure refinement package was employed for this purpose. Several peaks were located in the difference Fourier electron density maps. At this stage, it was found that the refinement was hampered by significant preferred orientation effects. These commonly persist in powder X-ray patterns taken in a Bragg-Brentano geometry from samples containing plate-like crystals, even after crushing the sample. Hence, an accurate refinement of the structure was not possible with this data. The powder synchrotron data, which is of Rietveld refinement quality, was used for structure refinement. The background was fitted using a shifted Chebyshev polynomial with 22 coefficients. A pseudo-Voigt function with an asymmetry correction (7 parameters in all) was used to model the profile shape. The final number of structural parameters (fractional atomic coordinates, lattice parameters, and isotropic atomic displacement factors) was 74. Including the profile scaling factor, the total number of refinable parameters was thus 104, with 3900 observations. Also, the number of observed unique hkl reflections was 1251, so that the fit of 74 structural parameters is sufficiently over-determined.

A bond length restraint (1.625±0.07 Å) was initially applied for the Si—O bonds, but the restraint weight parameter was progressively reduced to zero towards the completion of the refinement. After an initial fit of the background, profile shape, lattice parameters, and the locations of the already known atoms, four distinct peaks could be located in the difference Fourier maps. Since $Na^+$ cations and water molecules are isoelectronic, the assignment of the peaks can be assisted by considering their coordination environments. The empirical bond valence model was used to estimate the valence on each cationic extra-framework species, arising from the nearby oxygen atoms. Based on these considerations, two of the locations were assigned to $Na^+$ cations. At this stage, we obtained a charge-balanced balanced structure, with the remaining two Fourier peaks assignable to adsorbed water molecules. This leads to a total of 8 $Na^+$ cations and 16 water molecules.

To verify the locations and loading of the water molecules, we performed a grand canonical Monte Carlo (GCMC) simulation for adsorption of water in the crystal composed of the silicate layers and the metal cations. A Universal force field was used for representing the van der Waals interactions between the water molecules and the crystal. The electrostatic charges on all atoms were calculated by the electronegativity equalization technique. The simulation was carried out with the Cerius$^2$® program (Accelrys, Inc.), with a temperature of 300 K and a water vapor pressure of 3.2 kPa (the saturation vapor pressure of water at 300 K). Three types of MC moves—insertions, deletions and reorientations—were attempted. The simulations were carried out with a 1×2×1 supercell (22.783 Å×13.879 Å×13.5810 Å), leading to a loading of 31.8 molecules per supercell at convergence. This corresponded to loading of 15.9 water molecules/unit cell, which was in excellent agreement with the crystallographically assigned value of 16 water molecules/unit cell. Furthermore, FIG. 4 shows the distribution of accepted insertion sites for water molecules in the crystal structure during the MC simulations. This reveals the presence of two well-defined adsorption sites for water, whose locations correspond exactly to those suggested by the electron density maps. With a reliable assignment of all extra-layer species, the refinement proceeded smoothly to convergence, with a final residual Rwp=2.69% and c2=2.79.

Figure 12:
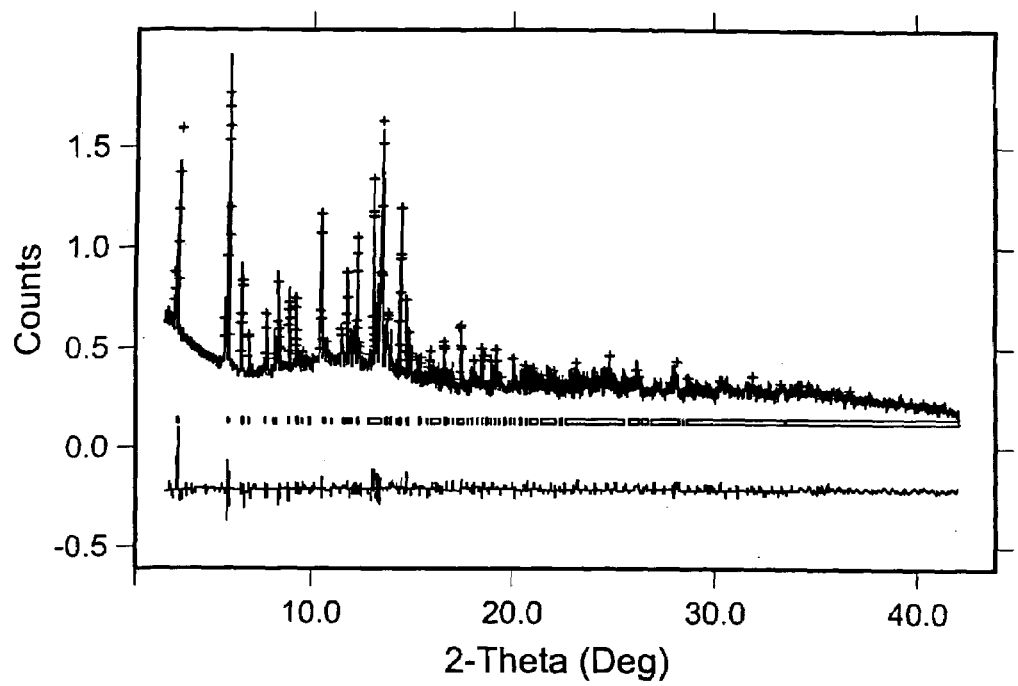
FIG. 12 is an observed powder synchrotron X-ray pattern of AMH 3.

FIG. 12 shows the observed powder synchrotron X-ray pattern, the calculated fit, the locations of the observed reflections, and the difference curve. Table 1 contains the refined structural parameters determined for the material, whereas Table 2 gives the bond lengths and angles in the material. For a discussion of these structural parameters, see, e.g., Hahn, T., International Tables for Crystallography, 4th ed., Kluwer Academic Publishers, Boston, 1996. Based on the structure described here, the unit cell formula for the layered silicate is $Na_8Sr_8Si_{32}O_{76}.16\ H_2O$. This chemical formula is charge balanced, and assigns full occupancy to the sodium cations so that the Na:Sr ratio is unity. The slightly lower Na:Sr ratio obtained from the ICP-OES analysis is possibly due to a partial substitution of the sodium cations with protons.

TABLE 1

Refined structural parameters for the layered silicate material.
Space group C2/c (No. 15), a = 22.7830(60), b = 6.9395(18), c = 13.5810(40), β = 92.5935(13), V = 2145.0(10) Å³. Estimated standard deviations (ESDs) are given as uncertainties in the last reported decimal digit.

| Atom | X | Y | Z | $U_{Iso}$*100 (Å²) | Wyckoff position | Occupancy |
|---|---|---|---|---|---|---|
| SI1 | 0.8780(3) | 0.0014(13) | 1.0183(5) | 1.3(3) | 8f | 1.0000 |
| SI2 | 0.9376(3) | −0.0325(11) | 0.7242(5) | 0.5(2) | 8f | 1.0000 |
| SI3 | 0.8830(3) | 0.2739(10) | 0.8399(5) | 0.3(2) | 8f | 1.0000 |
| SI4 | 0.8685(4) | −0.2914(11) | 0.8549(6) | 1.1(3) | 8f | 1.0000 |
| O1 | 0.9029(6) | 0.5027(23) | 0.8493(9) | 0.6(5) | 8f | 1.0000 |
| O2 | 0.8951(7) | 0.1981(19) | 0.9575(12) | 0.4(5) | 8f | 1.0000 |
| O3 | 0.9311(6) | 0.1779(20) | 0.7792(10) | 0.7(5) | 8f | 1.0000 |
| O4 | 0.8842(6) | −0.1634(18) | 0.7569(10) | 0.5(5) | 8f | 1.0000 |
| O5 | 0.8222(7) | 0.2262(20) | 0.7980(11) | 0.3(5) | 8f | 1.0000 |
| O6 | 0.8099(6) | 0.0035(21) | 0.0534(9) | 0.2(4) | 8f | 1.0000 |
| O7 | 0.8927(6) | −0.1828(18) | 0.9568(11) | 0.9(5) | 8f | 1.0000 |
| O8 | 1.0000 | −0.1159(27) | 0.7500 | 0.1(7) | 4e | 1.0000 |
| O9 | 0.5705(5) | 0.4965(21) | 0.3910(9) | 0.5(5) | 8f | 1.0000 |
| O10 | 0.7014(6) | 0.1927(18) | 0.6498(11) | 0.3(5) | 8f | 1.0000 |
| NA1 | 0.2500 | 0.2500 | 0.0000 | 3.3(6) | 4c | 1.0000 |
| NA2 | 0.5000 | 0.0314(24) | 0.2500 | 3.2(5) | 4e | 1.0000 |
| SR1 | 0.7697(1) | −0.0549(4) | 0.7145(20) | 1.3(1) | 8f | 1.0000 |
| Ow1 | 0.2896(8) | 0.0598(28) | 0.6074(12) | 3.5(5) | 8f | 1.0000 |
| Ow2 | 0.4430(6) | 0.0082(21) | 0.0977(9) | 0.7(4) | 8f | 1.0000 |

TABLE 2

Bond lengths and bond angles in the layered silicate material.

| Bond Length (Å) | | Bond Angle (°) | |
|---|---|---|---|
| SI1-O2 | 1.651(15) | O2-SI1-O6 | 112.6(8) |
| SI1-O6 | 1.645(13) | O2-SI1-O7 | 110.2(8) |
| SI1-O7 | 1.571(14) | O2-SI1-O9 | 102.3(8) |
| SI1-O9 | 1.662(13) | O6-SI1-O7 | 112.8(9) |
| SI2-O3 | 1.650(14) | O6-SI1-O9 | 115.4(7) |
| SI2-O4 | 1.598(14) | O7-SI1-O9 | 102.5(9) |
| SI2-O8 | 1.560(9) | O3-SI2-O4 | 107.0(8) |
| SI2-O9 | 1.587(12) | O3-SI2-O8 | 109.0(9) |
| SI3-O1 | 1.656(16) | O3-SI2-O9 | 107.4(8) |
| SI3-O2 | 1.693(17) | O4-SI2-O8 | 115.1(8) |
| SI3-O3 | 1.553(15) | O4-SI2-O9 | 107.9(8) |
| SI3-O5 | 1.508(15) | O10-SI2-O9 | 110.1(6) |
| SI4-O1 | 1.633(16) | O1-SI3-O2 | 101.1(8) |
| SI4-O4 | 1.653(14) | O1-SI3-O3 | 104.7(8) |
| SI4-O7 | 1.649(15) | O1-SI3-O5 | 119.0(9) |
| SI4-O10 | 1.595(15) | O2-SI3-O3 | 106.1(8) |
| NA1-O6 (×2) | 2.322(14) | O2-SI3-O5 | 113.4(10) |
| NA1-O10 (×2) | 2.393(15) | O3-SI3-O5 | 111.4(9) |
| NA1-Ow1 (×2) | 2.728(19) | O1-SI4-O4 | 108.1(8) |
| NA2-O1 (×2) | 2.653(13) | O1-SI4-O7 | 107.2(8) |
| NA2-O3 (×2) | 2.597(18) | O1-SI4-O10 | 114.7(8) |
| NA2-Ow2 (×2) | 2.397(14) | O4-SI4-O7 | 110.7(8) |
| NA2-O8 | 2.883(25) | O4-SI4-O10 | 104.9(9) |
| SR1-O4 | 2.752(13) | O7-SI4-O10 | 111.2(9) |
| SR1-O5(1) | 2.530(14) | SI3-O1-SI4 | 135.4(10) |

TABLE 2-continued

Bond lengths and bond angles in the layered silicate material.

| Bond Length (Å) | | Bond Angle (°) | |
|---|---|---|---|
| SR1-O5(2) | 2.585(15) | SI1-O2-SI3 | 134.1(10) |
| SR1-O6 | 2.435(12) | SI2-O3-SI3 | 134.4(10) |
| SR1-O10(1) | 2.454(14) | SI2-O4-SI4 | 136.5(11) |
| SR1-O10(2) | 2.606(13) | SI1-O7-SI4 | 138.3(10) |
| | | SI2-O8-SI2 | 136.4(14) |
| | | SI1-O9-SI2 | 140.7(9) |

Table 3 shows the estimated valences on the cationic sites (Si(IV), Na(I), Sr(II)) due to contributions from nearby anionic oxygen sites, calculated with the parameters given in Altomare, A., Cascarano, G., Giacovazzo, C., Guagliardi, A., Burla, M. C., Polidori, G. & Camalli, M. SIRPOW.92— "A program for automatic solution of crystal structures by direct methods optimized for powder data," J. Appl. Cryst., 27, 435–436 (1994). The estimated valences on the extra-framework cations (NA1, NA2, SR1) are close to their formal valences. We have also calculated the valences on the Si(IV) sites. The estimated valences on SI1 and SI4 are close to the formal valence of 4.00, but those on SI2 and SI3 are somewhat higher.

TABLE 3

Estimated total bond valences for cationic sites Si(IV), Sr(II), and Na(I). The ESD on the valence is calculated using the Rietveld ESDs on the bond lengths.

| Cationic Site | Calculated valence |
|---|---|
| SR1 | 1.89(7) |
| NA1 | 1.05(4) |
| NA2 | 0.88(4) |
| SI1 | 3.93(15) |
| SI2 | 4.30(14) |

TABLE 3-continued

Estimated total bond valences for cationic sites Si(IV), Sr(II), and Na(I). The ESD on the valence is calculated using the Rietveld ESDs on the bond lengths.

| Cationic Site | Calculated valence |
| --- | --- |
| SI3 | 4.33(18) |
| SI4 | 3.92(16) |

Tables 1, 2, and 3 follow standard crystallographic notation familiar to those involved in crystal structure determination. Table 1 contains a list of crystallographically distinct atoms in the model that best fits the experimental X-ray diffraction data. Table 1 contains all sufficient information for defining the structure of AMH-3. Table 2 shows a collection of bond angles and distances calculated from the positions of the atoms and other information in Table 1. Table 3 provides further support for the validity of the proposed structure. The information in Table 1 was entered in visualization software to create graphical views of the arrangement of atoms in the structure. An example of visualization software includes the Oak Ridge Thermal Ellipsoid Plot Program (ORTEP) (see, e.g., L. J. Farrugia, *J. Appl. Cryst.* 30, 565 (1997), or the website at ornl.gov/ortep/ortep.html).

FIGS. 5(a)–5(c) show ORTEP views of the crystal structure as viewed down [010], [001] and [100] respectively. The presence of 8MRs in all three directions is evident. The layers are stacked along [100], with charge-balancing cations and water molecules in the interlayer space. The structure also contains 10MRs along the [011] direction. The asymmetric unit of the silicate layers is a 4MR, which is clearly visible in FIG. 5(c). From the structure of the layer, it appears that the atoms SI3 and SI4 are topologically similar and could possibly be related by a symmetry operation if the crystal had orthorhombic symmetry. However, the monoclinic angle deviates significantly from 90°, and the diffraction patterns could not be indexed adequately with an orthorhombic unit cell. The sodium cation NA1 is octahedrally coordinated by the atoms O6, O10 and Ow1, whereas the sodium cation NA2 is seven-coordinated by the O1, O3, O8 and Ow2 atoms. The SR1 cation is in a distorted octahedral coordination with the O4, O5, O6 and O10 atoms.

2. Synthesis of a Layered Aluminophosphate

A layered phosphate having sheets with a 4×6×8 network was solvo-thermally synthesized using the procedure described by Gao, Q. M., et al., in "Nonaqueous synthesis and characterization of a new 2-dimensional layered aluminophosphate $[Al_3P_4O_{16}]_3$-$3[CH_3CH_2NH_3]/+$," *J. Solid State Chem.*, 129(1), 37–44 (1997). This material was chosen due to its elliptic eight-membered rings, which have pore size of ca. 3.8×6.0 Å, making it useful as a selective phase of nanocomposite membrane for gas separation. In a typical synthesis, aluminum triisopropoxide (2.0 g) was added to the mixture of ethylene glycol (EG) (15.0 ml) and n-butanol (25.0 ml), then ethylamine (10 ml 75 wt % in water) was added, and then phosphoric acid (2.0 ml) was added dropwise. The mixture was stirred until homogeneous, sealed in a TEFLON®-lined autoclave with the filling rate about 70% (volume), and heated to 180° C. for 13 days under autogeneous pressure. Solid material was recovered by vacuum filtration from the liquid, washed with distilled water, and dried at ambient temperature.

3. Swelling and Exfoliation of the Layered Aluminophosphate

Layered materials were swollen and exfoliated to fabricate nanocomposite membranes. To swell the as-synthesized aluminophosphate, a long chain surfactant, cetyltrimethylammonium chloride (CTMA+Cl—), was intercalated by ion-exchange reaction between surfactant and ethylamine, which is an organic cation for the charge balance of the material. It was found that the swelling was easily done by mixing the crystals with an excess amount of CTMA+Cl— at elevated temperature (about 80° C.). An increase in the basal d100 spacing (observed by X-ray diffraction studies) between the layers confirmed that the as-synthesized aluminophosphate had been well swollen. Exfoliation was performed by forcing the swollen particles to delaminate in an aqueous solution under ultrasonication for 2 hours. After waiting for 24 hours, the colloidal suspension of nanosheets was obtained by decanting precipitates.

4. Fabrication of Nanocomposite Membrane Using Layer-by-Layer Deposition Technique Alternative multi-layered nanocomposite films of polymer and exfoliated aluminophosphate films on porous supports were prepared by the Layer-by-Layer (LBL) deposition method, as described in E. R. Kleinfeld and G. S. Ferguson, "Stepwise Formation of Multilayered Nanostructural Films from Macromolecular Precursors," *Science*, 265 (5170) 370–373 (1994), and "Mosaic Tiling in Molecular Dimensions," *Advanced Materials*, 7(4) 414–416 (1995). The sequential electrostatic LBL deposition produced multilayers of anionic aluminophosphate nanosheet and cationic polydiallyldimethylammonium chloride (PDDA).

The procedure is summarized as follows:

1. Mesoporous silica film on a porous alumina support was dipped into a 5 wt. % aqueous PDDA solution for about 20 seconds.

2. Next, the film was dried in air for about 10 minutes.

3. The dried film was then dipped into a colloidal suspension of the layered materials, also for about 20 seconds.

4. The film was again dried in air.

5. Steps 1 to 5 were repeated until a desired membrane thickness was achieved.

Figure 13:
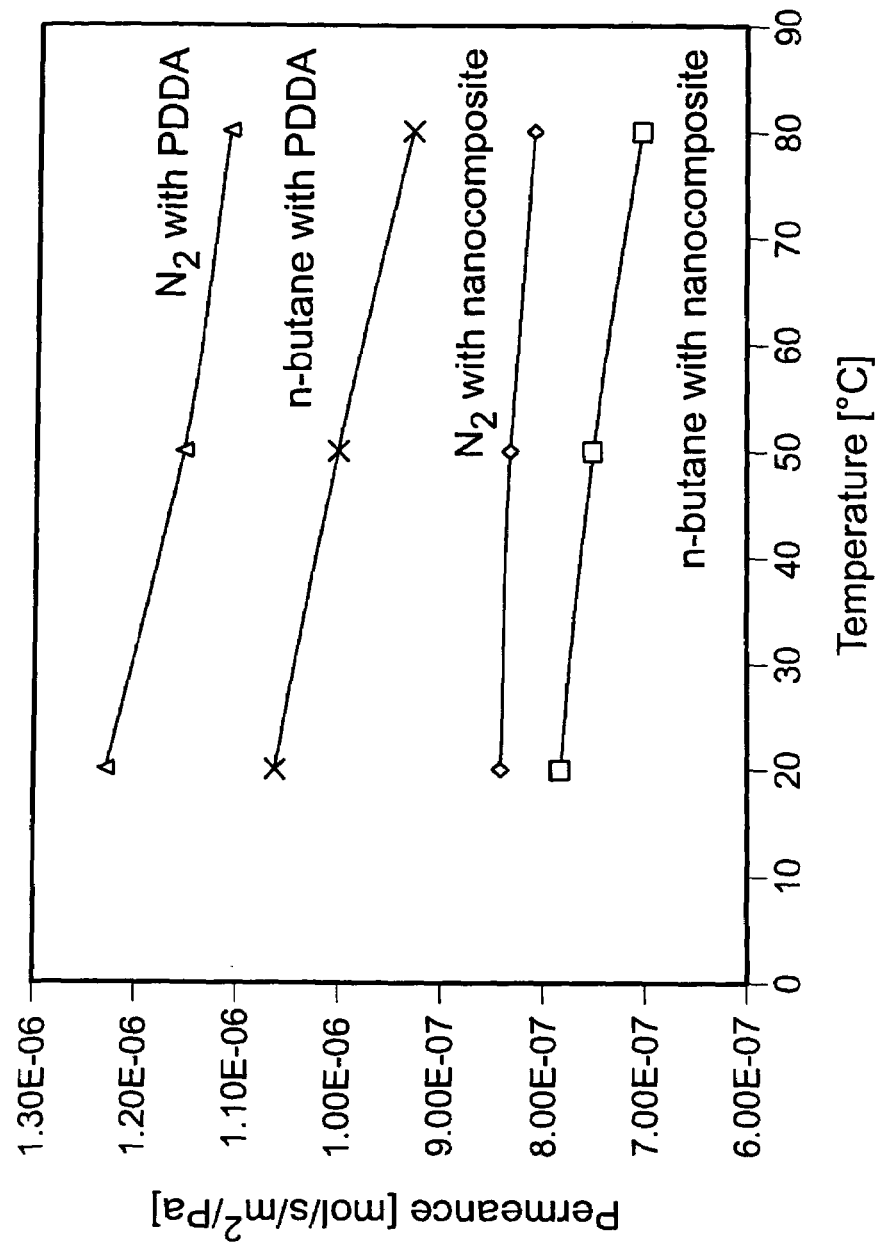
FIG. 13 is a plot comparing the nitrogen and n-butane permeabilities of a cationic polydiallyldimethylammonium (PDDA) chloride membrane to an aluminophosphate-PDDA composite membrane at different temperatures.

To demonstrate the idea of fabricating a nanocomposite membrane for gas separation using LBL technique, an exemplary multi-layered film was produced by depositing three polymeric layers and two aluminophosphate nanosheet layers alternatively. For comparison, a pure polymeric membrane (i.e., PDDA) of similar thickness was also fabricated. Nitrogen permeation as a function of temperature was measured for each film. Referring to FIG. 13, the nitrogen and n-butane permeation studies indicated reduced nitrogen and n-butane permeation in the composite film compared to the pure PDDA film. In particular, from about 20° C. to about 80° C., the PDDA membrane nitrogen permeance varied between about $1.25 \times 10^{-6}$ and $1.10 \times 10^{-6}$ mol/s/m²/Pa, while the nanocomposite membrane permeance varied between about $0.85 \times 10^{-6}$ and $0.80 \times 10^{-6}$ mol/s/m²/Pa. Within the same temperature range, the PDDA membrane n-butane permeance varied between about $1.06 \times 10^{-6}$ and $0.93 \times 10^{-6}$ mol/s/m²/Pa, while the nanocomposite membrane permeance varied between about $0.80 \times 10^{-6}$ and $0.70 \times 10^{-6}$ mol/s/m²/Pa. Selectivities of nitrogen over n-butane of both membranes are slightly over one. However, within the experimental error, the PDDA membrane showed slightly better selectivity that the nanocomposite membrane.

Other Embodiments

A number of embodiments of the invention have been described. Nevertheless, it will be understood that various modifications may be made without departing from the spirit and scope of the invention.

What is claimed is:

1. A layered silicate material comprising:
   a first layer including a plurality of tetrahedral $SiO_4$ units, the first layer having a first plurality of channels extending from a top side of the first layer to a bottom side of the first layer, wherein each channel in the first plurality of channels is defined by an X-membered ring where X is an integer and is the same for each channel;
   the first layer further including a second plurality of channels extending essentially parallel to the top side of the first layer.

2. The layered silicate material of claim 1, wherein X is 8.

3. The layered silicate material of claim 1, wherein X is 12.

4. The layered silicate material of claim 1, wherein the channels in the first plurality of channels have diameters in a range of about 3–6 Angstroms.

5. The layered silicate material of claim 1, wherein the top side is approximately parallel to the bottom side.

6. The layered silicate material of claim 1, further comprising a second layer comprising a plurality of $SiO_4$ units and having a plurality of channels extending from a first side of the second layer to a second side of the second layer.

7. The layered silicate material of claim 6, wherein the bottom side of the first layer is approximately parallel to the top side of the second layer.

8. The layered silicate material of claim 6, wherein the first plurality of channels in the first layer are registered with the channels in the second layer.

9. The layered silicate material of claim 6, further comprising a plurality of cations located between the bottom side of the first layer and top side of the second layer.

10. The layered silicate material of claim 9, wherein the cations comprise sodium ions or strontium ions.

11. The layered silicate material of claim 1, wherein the first layer is no more than about 50 Angstroms thick.

12. The layered silicate material of claim 1, further comprising a third plurality of channels extending essentially parallel to the top side of the first layer and essentially perpendicular to the second plurality of channels.

13. The layered silicate material of claim 1, further comprising another element substituted for a portion of the Si atoms in the material.

14. The layered silicate material of claim 13, wherein the element provides acid catalytic sites within the layer.

15. The layered silicate material of claim 13, wherein the element provides base catalytic sites within the layer.

16. The layered silicate material of claim 13, wherein the element is Al, B, Ge, Ce, or Ti.

17. A composite material, comprising a continuous phase and a dispersed phase, wherein the continuous phase comprises a polymer and the dispersed phase comprises the layered silicate material of claim 1.

18. The composite material of claim 17, wherein the polymer is selected from the group of nylon, polyolefin, polystyrene, ethylene-vinyl acetate copolymer, polyurethane, polyimide and poly(ethylene terephthalate).

19. A porous membrane comprising the composite material of claim 17.

20. The layered silicate material of claim 1, wherein each channel in the first plurality of channels has a minimum diameter of more than about 3 Angstroms and a maximum diameter of less than about 20 Angstroms.

21. A layered silicate material comprising a first layer including a plurality of tetrahedral $SiO_4$ units, the first layer having a plurality of channels extending from a top side of the first layer to a bottom side of the first layer, wherein each channel is defined by an X-membered ring where X is an integer and is the same for each channel, and wherein the channels have diameters in a range of about 3–6 Angstroms.

* * * * *